United States Patent
Hayashikawa et al.

(10) Patent No.: US 8,792,529 B2
(45) Date of Patent: Jul. 29, 2014

(54) GAS LASER OSCILLATION DEVICE AND GAS LASER PROCESSING MACHINE

(75) Inventors: Hiroyuki Hayashikawa, Osaka (JP); Hitoshi Hongu, Hyogo (JP); Nobuo Shinno, Osaka (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 13/147,218

(22) PCT Filed: Feb. 16, 2010

(86) PCT No.: PCT/JP2010/000928
§ 371 (c)(1),
(2), (4) Date: Aug. 1, 2011

(87) PCT Pub. No.: WO2010/098031
PCT Pub. Date: Sep. 2, 2010

(65) Prior Publication Data
US 2011/0290768 A1    Dec. 1, 2011

(30) Foreign Application Priority Data

Feb. 24, 2009    (JP) .................................. 2009-040800

(51) Int. Cl.
*H01S 3/22* (2006.01)
*F04D 25/06* (2006.01)
*H01S 3/036* (2006.01)
*H01S 3/07* (2006.01)

(52) U.S. Cl.
CPC .............. *H01S 3/036* (2013.01); *F04D 25/062* (2013.01); *H01S 3/073* (2013.01)
USPC ............................................. 372/55; 372/58

(58) Field of Classification Search
USPC .......................................................... 372/55
See application file for complete search history.

(56) References Cited

U.S. PATENT DOCUMENTS

| | | | |
|---|---|---|---|
| 5,124,997 A | 6/1992 | Funakubo et al. | |
| 5,461,636 A * | 10/1995 | Karube et al. | 372/58 |
| 5,856,992 A * | 1/1999 | Karube et al. | 372/58 |
| 7,194,015 B2 * | 3/2007 | Hayashikawa et al. | 372/55 |
| 2007/0071057 A1 * | 3/2007 | Ohta et al. | 372/58 |

FOREIGN PATENT DOCUMENTS

| | | |
|---|---|---|
| JP | 60-136384 A | 7/1985 |
| JP | 2-194679 A | 8/1990 |
| JP | 2-222586 A | 9/1990 |
| JP | 8-335731 A | 12/1996 |
| JP | 2000-261067 A | 9/2000 |

OTHER PUBLICATIONS

International Search Report for PCT/JP2010/000928, Mar. 16, 2010.

* cited by examiner

*Primary Examiner* — Xinning Niu
*Assistant Examiner* — Vu A Vu
(74) *Attorney, Agent, or Firm* — RatnerPrestia

(57) ABSTRACT

A gas laser oscillator includes a discharge section for exciting laser gas, a blowing section for transmitting the laser gas, and a laser gas flowing path for forming a circulation route of the laser gas between the discharge section and the blowing section. The blowing section is formed of a rotary part to be rotated by a shaft driver and a non-rotary part not to be rotated. The rotary part includes a rotary shaft to which an impeller is mounted at an end, the shaft driver for rotating the rotary shaft, an upper bearing and a lower bearing coupled to the rotary shaft. The rotary part is detachable from the non-rotary part.

15 Claims, 5 Drawing Sheets

GAS LASER OSCILLATION DEVICE AND GAS LASER PROCESSING MACHINE

This application is a U.S. National Phase Application of PCT International Application PCT/JP2010/000928.

TECHNICAL FIELD

The present invention relates to a gas laser oscillator and a processing machine using the same gas laser oscillator.

BACKGROUND ART

FIG. 3 is a schematic diagram of a conventional axial-flow gas laser oscillator. The conventional axial-flow gas laser oscillator is described hereinafter with reference to FIG. 3. In FIG. 3, discharge tube 901 is made of dielectric material, e.g. glass. Electrodes 902 and 903 are placed around discharge tube 901. Power supply 904 is connected to electrodes 902 and 903. Discharge space 905 exists within discharge tube 901 across electrodes 902 and 903. Total reflection mirror 906 and partial reflection mirror 907 are rigidly placed at both ends of discharge space 905, thereby forming an optical resonator. Laser beam 908 is output from partial reflection mirror 907. Laser gas flowing path 910 indicates the flow route of laser gas flow 909, which circulates within the axial-flow gas laser oscillator. Heat exchangers 911 and 912 lower the temperature of laser gas that is warmed up by a discharge in discharge space 905 and blowing parts 913 which circulates the laser gas within the oscillator. Blowing parts 913 effects a flow speed of the laser gas of approx. 100 m/sec in discharge space 905. Laser gas flowing path 910 and discharge tube 901 are merged together at laser gas inlet port 914.

FIG. 4 schematically illustrates a conventional gas laser processing machine specializing in cutting a sheet metal. This conventional machine is described hereinafter with reference to FIG. 4. As shown in FIG. 4, laser beam 908 is reflected by reflection mirror 915 and is led around work-piece 916. Then laser beam 908 is condensed into an enriched energy beam by condensing lens 918 placed in torch 917, and then work-piece 916 is irradiated with the beam, whereby work-piece 916 can be cut. Work-piece 916 is rigidly mounted on processing table 919, and X-axis motor 920 or Y-axis motor 921 moves torch 917 relative to work-piece 916, so that work piece 916 is processed into a given shape.

The foregoing description refers to the structures of the conventional gas laser oscillator 900 and the conventional gas laser processing machine. Next, operation of the conventional gas laser oscillator 900 is described hereinafter.

The laser gas transmitted by blowing parts 913 travels through laser-gas flowing path 910 before it is introduced into discharge tube 901 via laser gas inlet port 914. The laser gas then generates electric discharge in discharge space 905 from electrodes 902 and 903. The laser gas flowing through discharge space 905 gets excited by gaining this discharge energy. The excited laser gas then is optically resonated by the optical resonator formed of total reflection mirror 906 and partial reflection mirror 907. Laser beam 908 is output from partial reflection mirror 907. Laser beam 908 thus produced is used for the applications, e.g. laser beam machining.

In general, the laser beam oscillator employs a centrifugal blowing parts, and FIG. 5 shows a structure of blowing parts 913 used in the conventional gas laser oscillator. Motor-rotor 922 is mounted on rotary shaft 923, and impeller 924 is mounted to the end of shaft 923. Motor-stator 926 is placed coaxially with motor-rotor 922 and is fixed to casing 925. Supply of AC power from the outside to motor-stator 926 generates a rotary magnetic field, which rotates rotor 922, thereby rotating impeller 924 via shaft 923. Scroll 927 is placed around impeller 924, and the rotation of impeller 924 thus generates laser gas flow 909.

Rotary shaft 923 is rotatably supported by bearings 928 placed at the upper section and the lower section of shaft 923, to which bearings 928 are coupled. Blowing parts 913 is formed of a rotary part and a non-rotary part, and the rotary part includes motor-rotor 922, rotary shaft 923, impeller 924, and bearings 928.

Patent Literature 1 discloses related art to the blowing parts, and this related art refers to a three-axis orthogonal type laser oscillator, in which a discharge section and a blowing section are separated from each other, and a blowing parts accommodated in the blowing section can be taken out to the outside. (Refer to, e.g. Patent Literature 1.)

The conventional gas laser oscillator 900 discussed previously has the following problems: Blowing parts 913 of the oscillator is one of the components to be replaced periodically at user's site. A cumulative working time of the gas laser oscillator 900, in general, exceeds 50,000 hours, and blowing parts 913, e.g. is replaced with a new one when the cumulative working time reaches approx. 16,000 hours. Blowing parts 913 includes some components that deteriorate over long hours, and most of those time-varying components are included in the rotating part. Bearing 928 wears fast among others, so that the end of service life of bearing 928 indicates that blowing parts 913 needs to be replaced.

It is natural to replace only bearing 928 for a revival of blowing parts 913; however, the dismount of bearing 928 requires disassembling the entire blowing parts 913, and an adjustment of the balance of the rotary section is needed. These steps need special equipment as well as one week for calibration. For job-shops who are the main users of the gas laser oscillators, the maximum allowable time for a routine inspection is only a half-day. The users are, therefore, obliged to replace entire blowing parts 913. As a result, the cost of the routine inspection rises. In other words, a cost reduction in the routine inspection with respect to blowing parts 913 has been a vital problem.

RELATED ART LITERATURE

Patent Document 1: Unexamined Japanese Patent Application Publication No. S60-136384

DISCLOSURE OF INVENTION

A gas laser oscillator of the present invention comprises the following structural elements:
 a discharge section for exciting laser gas;
 a blowing section for transmitting the laser gas; and
 a laser gas flowing path for forming a circulation route placed between the discharge section and the blowing section for circulating the laser gas.

The blowing section is formed of a rotary part rotated by a shaft driver, and a non-rotary part. The rotary part includes a rotary shaft to which an impeller is mounted at the end, the shaft driver, and upper bearing and a lower bearing coupled to the rotary shaft. The rotary part is detachable from the non-rotary part.

The foregoing gas laser oscillator needs not replace the entire blowing section with a new one during a routine inspection, and replacing the fewest possible components with new ones can revive the functions of the blowing section.

DETAILED DESCRIPTION OF PREFERRED EMBODIMENT

An exemplary embodiment of the present invention is demonstrated hereinafter with reference to the accompanying drawings.

Exemplary Embodiment

Figure 1:
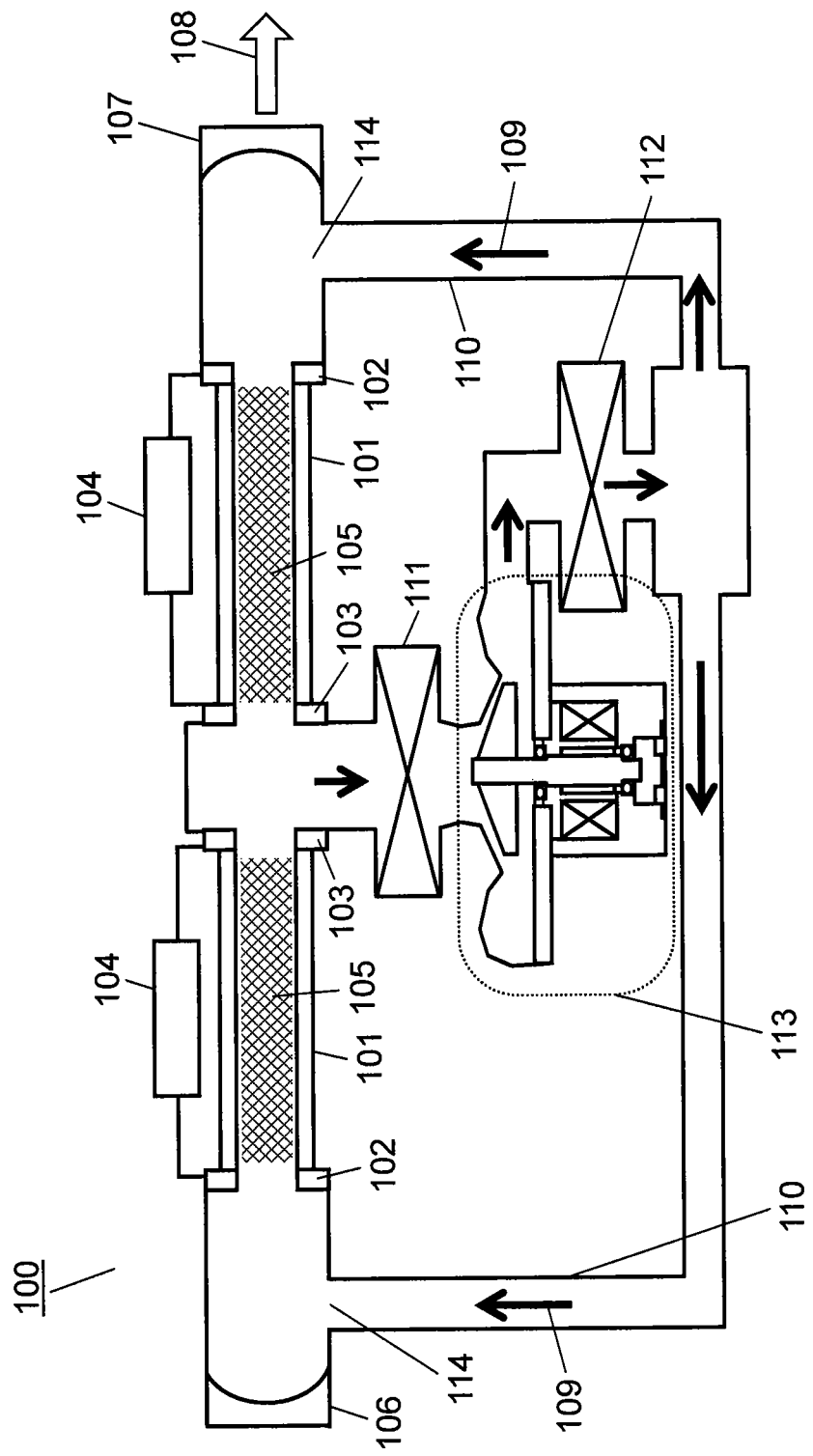
FIG. 1 shows schematically a structure of an axial-flow gas-laser oscillator in accordance with an embodiment of the present invention.

FIG. 1 shows schematically a structure of an axial-flow gas-laser oscillator in accordance with the embodiment of the present invention. Axial-flow gas laser oscillator 100 comprises the following structural elements: discharge tube 101, electrodes 102 and 103; power supply 104, total reflection mirror 106, partial reflection mirror 107, laser gas flowing path 110, heat exchangers 111 and 112, blowing section 113, and laser gas inlet port 114.

Discharge tube 101 working as a discharging section is formed of dielectric material, e.g. glass. Electrodes 102 and 103 are placed around discharge tube 101. Power supply 104 is connected to electrodes 102 and 103. Discharge space 105 exists within discharge tube 101 across electrodes 102 and 103. Total reflection mirror 106 and partial reflection mirror 107 are rigidly placed at both ends of discharge space 105, thereby forming an optical resonator. Laser beam 108 is output from partial reflection mirror 107.

Laser gas flow 109 indicates a circulation of laser gas flowing path 110 within oscillator 100. Heat exchangers 111 and 112 lower a temperature of laser gas which is warmed up by a discharge in discharge space 105 and an operation of blowing section 113, which circulates the laser gas. Laser gas flowing path 110 forms a circulation route of the laser gas between discharge tube 101 and blowing section 113. Blowing section 113 effects a flow speed of the laser gas of approx. 100 m/sec in discharge space 105. Laser gas flowing path 110 and discharge tube 101 are merged together at laser gas inlet port 114.

The operation of foregoing gas laser oscillator 100 of the present invention is demonstrated hereinafter.

The laser gas transmitted by blowing section 113 travels through laser-gas flowing path 110 before it is introduced into discharge tube 101 via laser gas inlet port 114. The laser gas then generates an electric discharge in discharge space 105 from electrodes 102 and 103.

The laser gas, which works as a laser medium within discharge space 105, gets excited by gaining this discharge energy. The excited laser gas is then optically resonated by the optical resonator formed of total reflection mirror 106 and partial reflection mirror 107. Laser beam 108 is output from partial reflection mirror 107. Laser beam 108 thus produced is used for the applications, e.g. laser beam machining.

Figure 2:
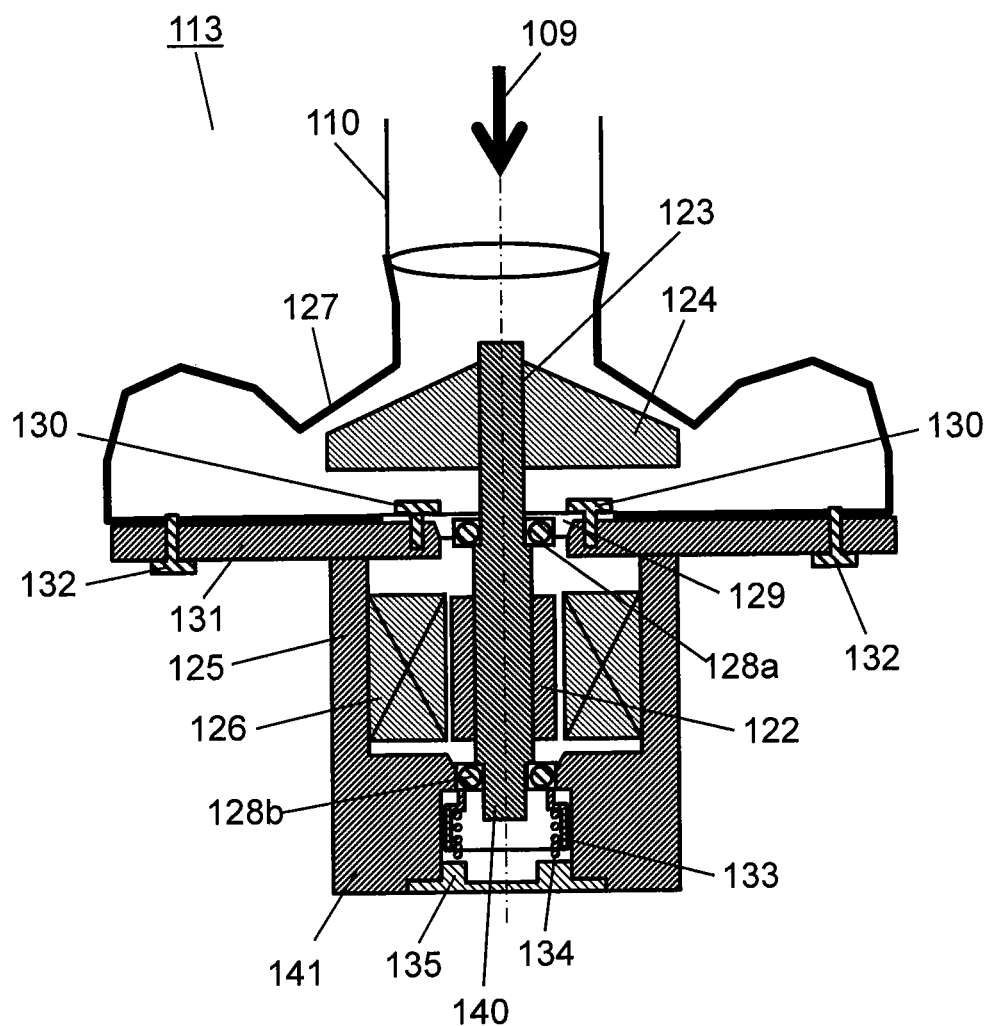
FIG. 2 is a sectional view of a structure of a blowing section in accordance with an embodiment of the present invention.
Figure 3:
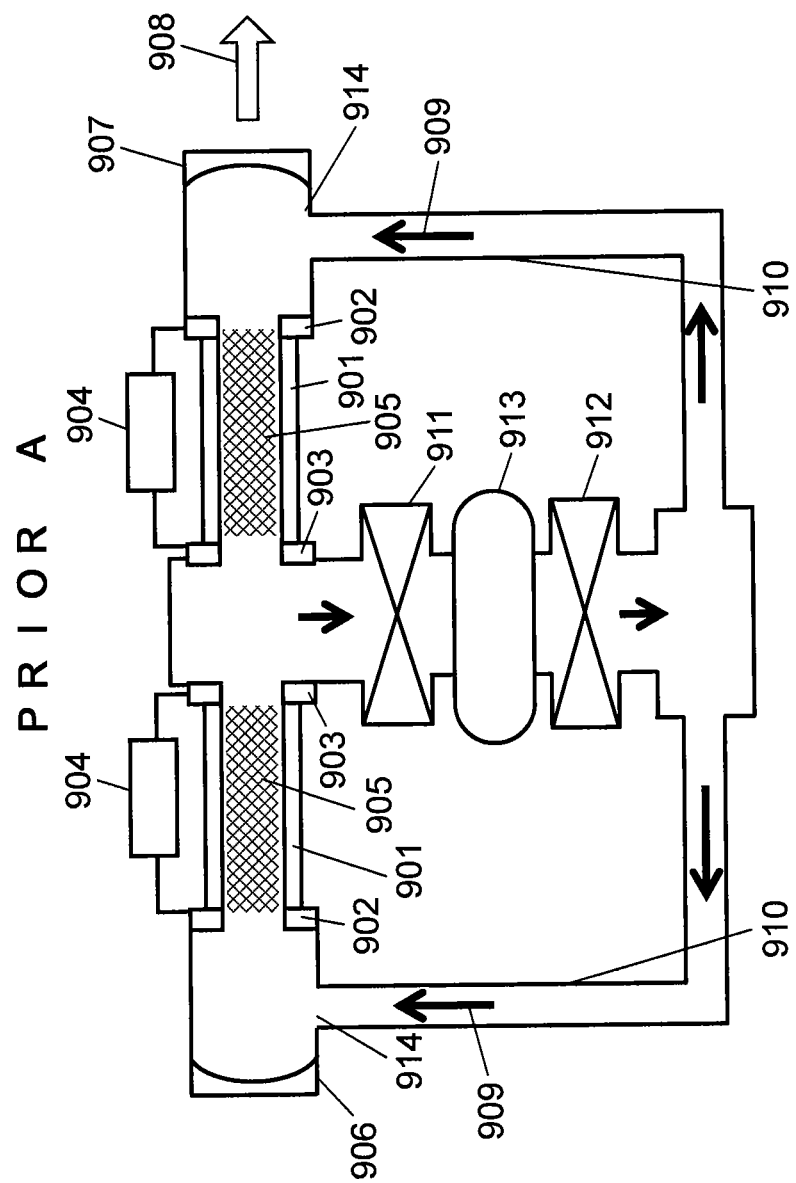
FIG. 3 shows schematically a structure of a conventional axial-flow gas-laser oscillator.
Figure 4:
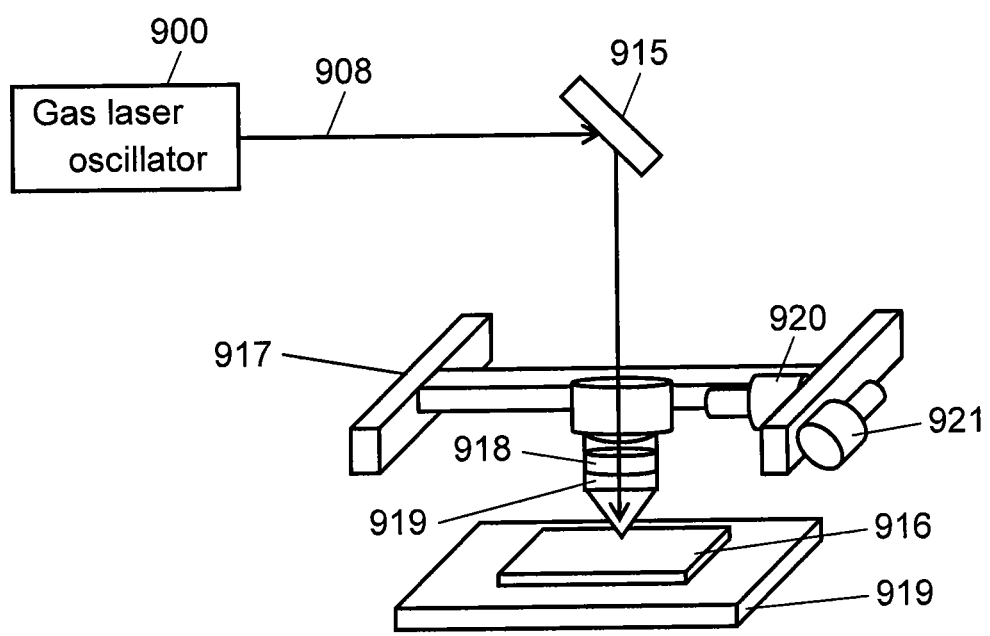
FIG. 4 shows schematically a structure of a conventional gas-laser processing machine specializing in cutting a sheet metal.
Figure 5:
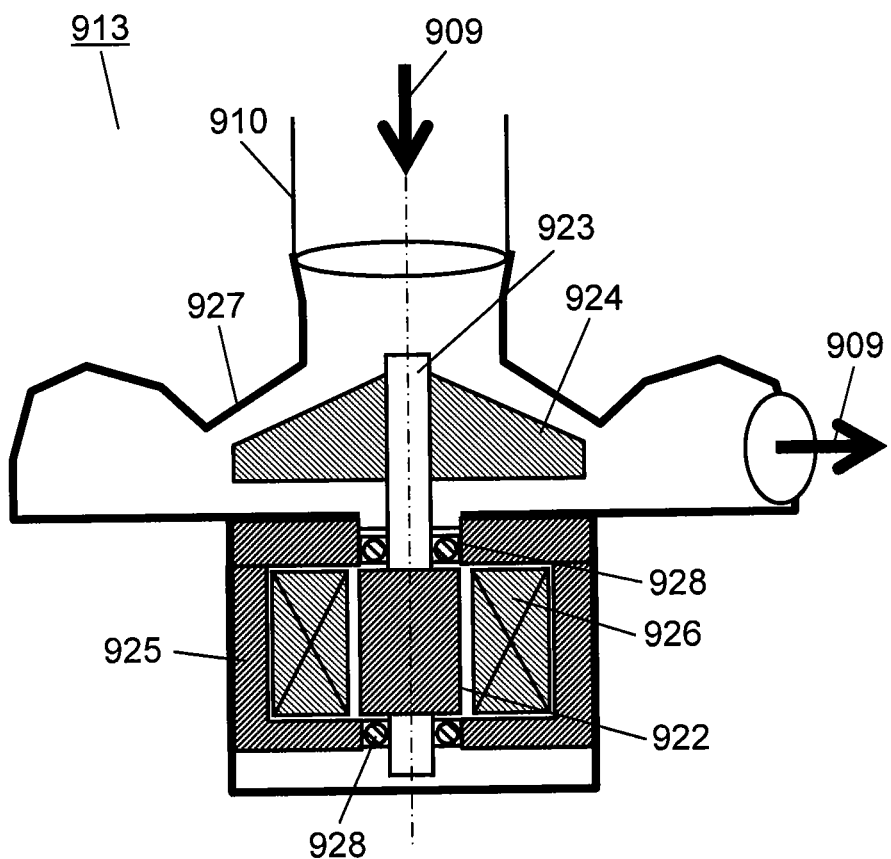
FIG. 5 shows a structure of a blowing parts of a conventional gas-laser oscillator.

Blowing section 113 employs a centrifugal blower. FIG. 2 shows a structure of blowing section 113 of the axial-flow gas laser oscillator in accordance with the embodiment of the present invention.

Blowing section 113 is formed of rotary part 140 that is driven by a shaft driver, and a non-rotary part 141 that does not rotate. The shaft driver is formed of motor-rotor 122 and motor-stator 126. Rotary part 140 includes rotary shaft 123 to which impeller 124 is mounted at the end, the shaft driver for rotating rotary shaft 123, upper bearing 128a and lower bearing 128b coupled to rotary shaft 123. Non-rotary part t141 includes blowing section 113 except rotary part 140.

The inner ring of upper bearing 128a is rigidly press-fitted to rotary shaft 123, and the outer ring of bearing 128a is rigidly press-fitted to bushing 129 of upper bearing 128a, and bushing 129 is fixed to upper lid 131 of an upper casing with bolts 130. Scroll 127 is fixed to lid 131 with bolts 132.

The inner ring of lower bearing 128b is rigidly press-fitted to rotary shaft 123, while the outer ring thereof can view a clearance on the order of micron between upper lid 131 and the outer ring of upper bearing 128a, so that the outer ring is loosely fitted. When bolts 130 are removed, the foregoing structure allows rotary shaft 123 to slide along a longitudinal direction thereof, while it allows regulating the movement of shaft 123 along a radius direction. In other words, bushing 129 of upper bearing 128a holds the outer wall of bearing 128a, and bushing 129 is coupled to upper lid 131 of the upper casing, while lower bearing 128b is coupled to casing 125.

The outer ring of lower bearing 128b is pre-loaded by spring 134 from the bottom, so that upper bearing 128a is urged against bushing 129 via rotary shaft 123. Bearing presser 133 and spring 134 are fixed to casing 125 by lower lid 135.

The joint part between bushing 129 of upper bearing 128a and upper lid 131 is tapered for fitting, so that the centering of shaft 123 can be done with ease when shaft 123 is mounted. In other words, at least one of the joint part between bushing 129 and lid 131 and another joint part between lower bearing 128b and casing 125 is tapered for fitting.

The rotary part of blowing section 113 is replaced with a new one in the following way at a user's site during the routine inspection: First, unfasten bolt 132 which rigidly mounts scroll 127 to lid 131, and remove scroll 127 upward. Next, unfasten bolt 130 which rigidly mounts housing 129 to lid 131. In this state, entire rotary shaft 123 is thrusted upward by spring 134, so that lower bearing 128b appears upward from the fitting part between itself and casing 125 to the tapered part. In a similar way, bushing 129, to which upper bearing 128a is fixed, appears upward from the tapered fitting part from the tapered fitting part of upper lid 131. In this state, hold the impeller 124 and lift it up, then rotary part 140 can be taken out with ease. In other words, rotary part 140 is detachable from non-rotary part 141.

In a case where a new rotary part 140 is inserted into casing 125, the reverse way to what is discussed above is done. Since the presence of the tapered part allows the centering work simply, rotary part 140 can be mounted with ease.

A gas laser processing machine in accordance with the embodiment of the present invention is equipped with the gas laser oscillator discussed above. This gas laser processing machine needs no replacement of entire blowing section 113 during the routine inspection, and thus allows reviving the functions of blowing section 113 by replacing the minimum components. A great reduction in the routine inspection fee is achievable, and the users can expect a better cost-performance of the gas laser processing machine.

INDUSTRIAL APPLICABILITY

A gas laser oscillator and a gas laser processing machine of the present invention can be used for applications, e.g. cutting a sheet metal or welding.

DESCRIPTION OF REFERENCE SIGNS 100 gas laser oscillator
101 discharge tube
102, 103 electrode
104 power supply
105 discharge space
106 total reflection mirror
107 partial reflection mirror
108 laser beam
109 laser gas flow
110 laser-gas flowing path
111 heat exchanger
112 heat exchanger
113 blowing section
114 laser gas inlet port
122 motor-rotor
123 rotary shaft
124 impeller
125 casing
126 motor-stator
127 scroll
128a upper bearing
128b lower bearing
129 bushing of upper bearing
130 bolt for fixing bushing
132 bolt for fixing scroll
133 bearing presser
134 spring
135 lower lid
140 rotary part
141 non-rotary part

The invention claimed is:

1. A gas laser oscillator comprising:
a discharge section for exciting laser gas;
a blowing section for transmitting the laser gas; and
a laser gas flowing path for forming a circulation route of the laser gas between the discharge section and the blowing section,
the blowing section comprises:
a rotary part to be rotated by a shaft driver; and
a non-rotary part not to be rotated;
the rotary part includes:
a rotary shaft to which an impeller is mounted at an end;
a motor-rotor of the shaft driver is coupled to the rotary shaft; and
an upper bearing and a lower bearing coupled to the rotary shaft,
wherein the rotary part is detachable from the non-rotary part, and
wherein contact of the lower bearing between the rotary part and the non-rotary part is less rigid than contact of the upper bearing between the rotary part and the non-rotary part.

2. The gas laser oscillator of claim 1 further comprising:
a bushing of the upper bearing for holding an outer wall of the upper bearing; and
a casing coupling the bushing and holding the lower bearing,
wherein at least one of a joint section between the bushing and the casing and another joint section between the lower bearing and the casing is tapered for fitting.

3. The gas laser oscillator of claim 1 further comprising a spring for thrusting the rotary shaft upward.

4. A gas laser processing machine equipped with the gas laser oscillator as defined in claim 1.

5. The gas laser oscillator of claim 2 further comprising a spring for thrusting the rotary shaft upward.

6. A gas laser processing machine equipped with the gas laser oscillator as defined in claim 2.

7. A gas laser processing machine equipped with the gas laser oscillator as defined in claim 3.

8. A gas laser processing machine equipped with the gas laser oscillator as defined in claim 5.

9. A gas laser processing machine equipped with the gas laser oscillator as defined in claim 1.

10. The gas laser oscillator of claim 1, wherein the upper bearing is in contact with the non-rotary part via a bushing which, when actuated, releases with the rotary shaft from another portion of the non-rotary part.

11. A gas laser oscillator comprising:
a discharge section for exciting laser gas;
a blowing section for transmitting the laser gas; and
a laser gas flowing path for forming a circulation route of the laser gas between the discharge section and the blowing section,
the blowing section comprises:
a rotary part to be rotated by a shaft driver; and
a non-rotary part not to be rotated;
the rotary part includes:
a rotary shaft to which an impeller is mounted at an end;
a motor-rotor of the shaft driver is coupled to the rotary shaft
an upper bearing and a lower bearing coupled to the rotary shaft; and
a bushing of the upper bearing for holding an outer wall of the upper bearing;
a casing coupling the bushing and holding the lower bearing,
wherein the rotary part is detachable from the non-rotary part,
wherein at least one of a joint section between the bushing and the casing and another joint section between the lower bearing and the casing is tapered for fitting, and
wherein contact of the lower bearing between the rotary part and the non-rotary part is less rigid than contact of the upper bearing between the rotary part and the non-rotary part.

12. The gas laser oscillator of claim 11, wherein the upper bearing is in contact with the non-rotary part via the bushing which, when actuated, releases with the rotary shaft from another portion of the non-rotary part.

13. A gas laser processing machine equipped with the gas laser oscillator as defined in claim 11.

14. A gas laser oscillator comprising:
a discharge section for exciting laser gas;
a blowing section for transmitting the laser gas; and
a laser gas flowing path for forming a circulation route of the laser gas between the discharge section and the blowing section,
the blowing section comprises:
a rotary part to be rotated by a shaft driver; and
a non-rotary part not to be rotated;
the rotary part includes:

a rotary shaft to which an impeller is mounted at an end;
a motor-rotor of the shaft driver is coupled to the rotary shaft; and
an upper bearing and a lower bearing coupled to the rotary shaft,
a spring for thrusting the rotary shaft upward,
wherein the rotary part is detachable from the non-rotary part, and
wherein contact of the lower bearing between the rotary part and the non-rotary part is less rigid than contact of the upper bearing between the rotary part and the non-rotary part.

15. The gas laser oscillator of claim 14, wherein the upper bearing is in contact with the non-rotary part via a bushing which, when actuated, releases with the rotary shaft from another portion of the non-rotary part.

* * * * *